(12) United States Patent
Thorpe et al.

(10) Patent No.: US 11,855,446 B2
(45) Date of Patent: *Dec. 26, 2023

(54) REMOTE DEVICE MANAGEMENT

(71) Applicant: FireAvert, LLC, Springville, UT (US)

(72) Inventors: Peter Thorpe, Lehi, UT (US); Larsen Alma Webb, Lindon, UT (US)

(73) Assignee: FireAvert, LLC, Springville, UT (US)

( * ) Notice: Subject to any disclaimer, the term of this patent is extended or adjusted under 35 U.S.C. 154(b) by 312 days.

This patent is subject to a terminal disclaimer.

(21) Appl. No.: 17/220,687

(22) Filed: Apr. 1, 2021

(65) Prior Publication Data

US 2021/0313795 A1 Oct. 7, 2021

Related U.S. Application Data (60) Provisional application No. 63/004,643, filed on Apr. 3, 2020.

(51) Int. Cl.
| | | |
|---|---|---|
| H02H 7/20 | (2006.01) | |
| G08B 17/117 | (2006.01) | |
| G08B 31/00 | (2006.01) | |
| G08B 29/04 | (2006.01) | |
| A62C 3/16 | (2006.01) | |
| H02H 1/00 | (2006.01) | |
| G05B 13/02 | (2006.01) | |
| G05B 13/04 | (2006.01) | |
| A62C 3/00 | (2006.01) | |
| G08B 21/10 | (2006.01) | |

(52) U.S. Cl.
CPC .............. *H02H 7/20* (2013.01); *A62C 3/006* (2013.01); *A62C 3/16* (2013.01); *G05B 13/0265* (2013.01); *G05B 13/048* (2013.01); *G08B 17/117* (2013.01); *G08B 21/10* (2013.01); *G08B 29/043* (2013.01); *G08B 31/00* (2013.01); *H02H 1/0007* (2013.01)

(58) Field of Classification Search
CPC ..... G08B 17/117; G08B 29/043; A62C 3/006; F24C 3/12; H05B 1/0266
See application file for complete search history.

(56) References Cited

U.S. PATENT DOCUMENTS

| | | |
|---|---|---|
| 2,407,719 A | 9/1946 | Melchior |
| 2,488,375 A | 11/1949 | Carlson |
| 4,496,817 A | 1/1985 | Smith |
| 4,499,368 A | 2/1985 | Payne |

(Continued)

FOREIGN PATENT DOCUMENTS

| | | |
|---|---|---|
| EP | 1 552 489 B1 | 12/2008 |
| WO | 2018/147482 A1 | 8/2018 |

*Primary Examiner* — Mirza F Alam
(74) *Attorney, Agent, or Firm* — Greenberg Traurig, LLP (57) ABSTRACT

Embodiments described herein are directed to methods and apparatuses for remotely managing electrical and gas devices. In one scenario, a computer system performs a method for remotely managing electrical devices. The method may include determining that an electrical device has changed state, notifying at least one user that the electrical device has changed state, and either receiving an indication from the user that the electrical device is to be turned off, and turning the electrical device off, or receiving an indication from the user that the electrical device is to be turned on, and turning the electrical device on.

21 Claims, 4 Drawing Sheets

(56) References Cited

U.S. PATENT DOCUMENTS

| | | |
|---|---|---|
| 5,422,629 A | 6/1995 | Minnis |
| 5,508,568 A | 4/1996 | Mammen |
| 6,762,688 B2 | 7/2004 | Johnston et al. |
| 7,113,075 B2 | 9/2006 | Odorcic et al. |
| 7,199,721 B2 | 4/2007 | Shirlee |
| 8,587,444 B2 | 11/2013 | Cadima et al. |
| 8,783,243 B2 | 7/2014 | Hodapp, Jr. et al. |
| 8,807,523 B2 | 8/2014 | Pitchford et al. |
| 8,836,522 B2 | 9/2014 | Thorpe et al. |
| 8,890,034 B2 | 11/2014 | Mishra |
| 9,030,319 B1 | 5/2015 | Haynes |
| 9,078,449 B2 | 7/2015 | Bach et al. |
| 9,418,528 B2 | 8/2016 | Stokes |
| 9,444,244 B2 | 9/2016 | Hooper et al. |
| 9,466,195 B1 | 10/2016 | Boyer et al. |
| 9,476,595 B2 | 10/2016 | Cadima |
| 9,643,037 B2 | 5/2017 | Vermeersch et al. |
| 9,846,413 B2 | 12/2017 | Thorpe et al. |
| 9,909,764 B2 | 3/2018 | Bach |
| 9,922,529 B2 | 3/2018 | Thorpe et al. |
| 9,928,672 B2 | 3/2018 | Jablokov et al. |
| 9,964,447 B2 | 5/2018 | Fadell et al. |
| 10,009,965 B2 | 6/2018 | Kim et al. |
| 10,161,806 B2 | 12/2018 | Lermann |
| 10,228,147 B2 | 3/2019 | Babu et al. |
| 10,333,731 B2 | 6/2019 | Ebrom et al. |
| 10,438,472 B2 | 10/2019 | Peterson et al. |
| 10,546,469 B2 | 1/2020 | Peterson et al. |
| 10,555,383 B1 | 2/2020 | Caccamo |
| 10,867,217 B1 * | 12/2020 | Madden ............... G06V 10/764 |
| 2002/0044061 A1 | 4/2002 | Johnston et al. |
| 2006/0044133 A1 | 3/2006 | Lou |
| 2008/0018484 A1 | 1/2008 | Sager |
| 2010/0073174 A1 | 3/2010 | Dufour |
| 2014/0257588 A1 | 9/2014 | Matesa, Jr. |
| 2015/0161835 A1 * | 6/2015 | Jablokov ................. H04Q 9/00 340/5.61 |
| 2015/0262468 A1 | 9/2015 | Yang |
| 2016/0231721 A1 * | 8/2016 | Lakshmanan ........ G05B 19/042 |
| 2018/0003392 A1 * | 1/2018 | Babu ..................... F24C 7/088 |
| 2019/0120497 A1 * | 4/2019 | Paller .................... F24C 3/082 |

* cited by examiner

REMOTE DEVICE MANAGEMENT

CROSS-REFERENCE TO RELATED APPLICATIONS

This application claims priority to and the benefit of U.S. Provisional Patent App. No. 63/004,643, entitled "Remote Device Management," filed on Apr. 3, 2020, which application is incorporated by reference herein in its entirety.

BACKGROUND

Each year, many homes and apartments are destroyed by fire. Most of these residences have smoke alarms that warn the residents to try to escape before suffering bodily harm. These smoke alarms, however, are only designed to monitor for smoke and then sound an alarm upon detecting a sufficient amount of smoke. Smoke alarms do nothing to prevent fires from starting in the first place.

BRIEF SUMMARY

Embodiments described herein are directed to methods and apparatuses for remotely managing electrical and gas devices. In one embodiment, a computer system performs a method for remotely managing electrical devices. The method may include determining that an electrical device has changed state (e.g., from off to on or from low to high). The method may next include notifying at least one user that the electrical device has changed state, and may then either receive an indication from the user that the electrical device is to be turned off, and subsequently turning the electrical device off, or may receive an indication from the user that the electrical device is to be turned on (or left on), and the turning the electrical device on or leaving it on.

In some embodiments, turning the electrical device off comprises sending a control signal to an electromechanical component that, when switched, prevents power from reaching the electrical device.

In some examples, the electrical device is an electric stove, while in other cases, the electrical device is a gas stove, an electric or gas oven, a washing machine, a clothes dryer, a heating pad, a laptop, a blow drier, a hair straightener, or other electrical or natural gas-powered device.

In some embodiments, determining that the electrical device has changed state further includes monitoring an amount of current flowing to the electrical device and determining when the amount of current changes beyond a specified threshold amount.

In some cases, the electrical device may be turned off according to a timer whose length is customized for a specific user. In some examples, notifying the user that the electrical device has changed state is performed automatically upon determining that the user has traveled beyond an established geofence. In some cases, the geofence is established separately for each user.

In some embodiments, notifying a user that the electrical device has changed state is performed automatically upon determining that a smoke alarm within a specified distance of the electrical device is disconnected from power. In some examples, notifying a user that the electrical device has changed state is performed automatically upon determining that a smoke alarm within a specified distance of the electrical device has signaled an alarm.

In some cases, notifying a user that the electrical device has changed state is performed automatically upon determining that the temperature in an area around the electrical device has risen beyond a specified amount. In some examples, notifying the user that the electrical device has changed state may be performed automatically upon determining that a motion sensor in an area around the electrical device has sensed a minimum amount of movement.

In some embodiments, a system is provided that includes at least one physical processor and physical memory that includes computer-executable instructions that, when executed by the physical processor, cause the physical processor to: determine that at least one electrical device has changed state, notify at least one user that the electrical device has changed state, and either receive an indication from the user that the electrical device is to be turned off and turn the electrical device off, or receive an indication from the user that the electrical device is to be turned on and turn the electrical device on.

In some cases, the system may further learn, over a specified period of time, one or more of the user's behaviors with respect to the electrical device and modify the step of notifying the user that the electrical device has changed state based on the user's learned behaviors.

In some embodiments, the system may further determine which user changed the electrical device's state and turn the electrical device off or turn the electrical device on depending on which user changed the electrical device's state. In some cases, the system may further lock out the electrical device for a specified period of time. In some examples, the system may further gather usage data related to use of the electrical device and, based on the gathered usage data, predict which users have the highest level of risk associated with the electrical device. In some cases, the prediction may be based on usage data indicating how many times a smoke alarm associated with the user has been activated over a specified period of time.

In some embodiments, a computer-implemented method is provided for remotely managing gas-based appliances. The method may include determining that at least one gas-based appliance has changed state, notifying at least one user that the gas-based appliance has changed state, and either receive an indication from the user that the gas-based appliance is to be turned off and cut off gas supply to the gas-based appliance, or receive an indication from the user that the gas-based appliance is to be turned on and initiate gas supply to the gas-based appliance.

In some cases, cutting off gas supply to the gas-based appliance may include sending a control signal to an electromechanical component that, when switched, prevents gas from reaching the gas-based appliance. In some embodiments, the gas-based appliance may be a gas stove, a gas drier, or a gas oven. In some cases, cutting off gas supply to the gas-based appliance may include sending a control signal to an electromechanical component that, when switched, prevents gas from reaching the gas-based appliance by cutting off gas at the main natural gas line to a home or apartment. Still further, in some embodiments, the gas to the gas-based appliance may be cut off in response to a seismic event detected at a home or apartment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

As will be described further below, different types of computer systems may be implemented to perform methods for remotely managing electrical devices. The electrical devices that are managed may include substantially any devices or systems that operate using electricity, gas, or other fuel sources. The methods performed by these computer systems may include determining that an electrical device has changed state (e.g., the device has been turned on or off). The methods may next include notifying a user that the electrical device has changed state, and then either receiving an indication from the user that the electrical device is to be turned off and turning the electrical device off, or, receiving an indication from the user that the electrical device is to be turned on and turning the electrical device on or otherwise changing the device's state.

For example, in one embodiment, an appliance owner may have a stove, an oven, a burner, a hair straightener, a space heater, or other appliance or device that heats up using electricity or gas. These appliances or devices have the ability (and even the propensity) to burn or start fires. The embodiments described herein may include controllers, processors, software code, firmware, embedded code, or hard-coded application-specific integrated circuits (ASICs), field-programmable gate arrays (FPGAS) or other computing hardware or software for controlling such electrical, gas-based, or other devices (e.g., an electric range or oven). The computing hardware, software, or a combination thereof (referred to simply as a "controller" herein) may be configured to send and receive data signals including transmitting a notification indicating that an appliance has changed state and receiving an indication that the appliance is to be allowed to remain in that state or is to be changed to a different state.

For instance, a parent who has left their house may have one or more children back at home. The parent may not want their children to turn on the stove or other similar device. When the child attempts to turn on the electrical or gas device, the controller may detect that attempt and may send a notification to the child's parent via a text message, email, phone alert, car alert, or via some other communication channel. The parent may then see that someone has tried to turn on the electrical or gas device. That parent may then determine whether to allow the device to continue running or to prevent the device from continuing to run. The parent may send a communication (e.g., a text message, an email, an application command, a Bluetooth command, a mesh network signal, or other radio communication) back to the controller. The controller may then either allow the electrical or gas-based device to continue running and may allow gas or electricity to flow to the device, or the controller may send a termination signal to the device (or to an intermediary component) and prevent gas or electricity from flowing to the device. These concepts will be described in greater detail below with regard to FIGS. 1-6.

Figure 1:
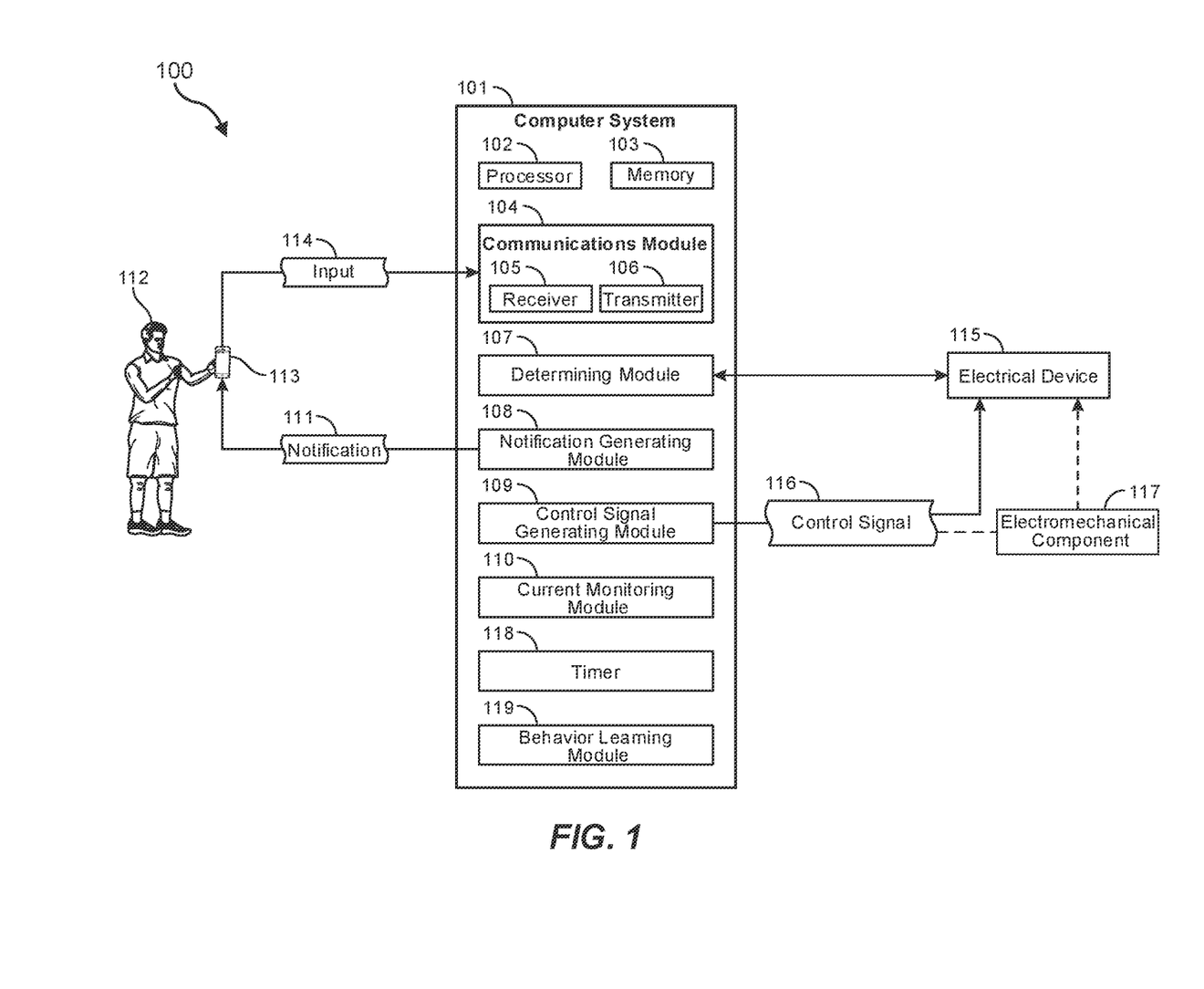
FIG. 1 illustrates a computing environment in which one or more of the embodiments described herein may operate.

FIG. 1 illustrates a computing environment 100 in which an electrical device may be controlled remotely. FIG. 1 includes various electronic components and elements including a computer system 101 that may be used, alone or in combination with other computer systems, to perform tasks associated with the remote management and control of electrical or gas-powered devices. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, mesh network radios, long range (LoRa) radios, z-wave radios, or other types of receivers, transmitters, transceivers, or other hardware components configured to transmit and/or receive data. The communications module 104 may be configured to interact with databases, mobile computing devices (such as mobile phones or tablets), embedded computing systems, or other types of computing systems.

The computer system 101 also includes a determining module 107. The determining module 107 may be configured to determine that an electrical device has changed state. For example, the determining module 107 may determine that electrical device 115 has changed state. The change in state may include a change from off to on, a change from one temperature to another (higher or lower) temperature, a change in a specific burner from high to low or from off to on, an indication of a delayed start being initiated, a change in state to indicate that a timer has started to run the appliance for a specific amount of time, or any other change in state. As noted above, the electrical device 115 may be substantially any device configured to run on electricity, whether wall-powered, battery-powered, solar-powered, or otherwise electrically powered. Moreover, the electrical device 115 may be a single device, a pair of devices, or a group of devices. In cases where the electrical device 115 represents a group of electrical devices, the devices may be in a single location (e.g., one house or apartment), or may be distributed over multiple houses, apartment complexes, cities, states, or countries. While frequent references to an "electrical device" are made herein, it will be recognized that the principles herein also apply to gas-powered or gas-based devices or appliances, even if such are not specifically referenced.

Once the determining module 107 has determined that the electrical device 115 has changed state, the notification generating module 108 may generate one or more notifications 111 notifying a user 112 of the electrical device's change in state. The notification 111 may be sent to a single user 112 (or, more specifically, to a device 113 associated with the user) or to a group of users. In some cases, for example, the notification 111 may be sent to a parent, a guardian, or other adult that is in charge of a home or apartment. In other cases, the notification 111 may be sent to the guardian of an elderly person. In still other cases, the notification 111 may be sent to a specified list of people including, perhaps, property owners, apartment managers, insurance entities, and/or other recipients.

After the notification(s) 111 have been sent to the respective user 112 and/or other users, the communications module 104 may receive an indication via input 114 that the electrical device 115 is to be turned off or turned on, or is to have a different state change applied. The control signal generating module 109 may generate a control signal 116 and send the control signal to the electrical device 115. In some cases, it should be noted, the control signal generating module 109 sends the control signal 116 directly to the electrical device 115, and in other cases, the control signal generating module 109 sends the control signal 116 to an electromechanical component 117. The electromechanical component 117 may be a separate device that sits between the electrical device 115 and its power source (e.g., a wall socket or a battery). As will be explained further below, the electromechanical component 117 may include hardware components such as solenoids that are configured to allow or prevent electricity or gas from reaching the electrical device 115, depending on how the solenoid is switched. Other types of electromechanical components, solid-state relays, or switches may be used as intermediaries. These embodiments will be described further below with regard to method 200 of FIG. 2, and with regard to the embodiments depicted in FIGS. 3-6.

Figure 2:
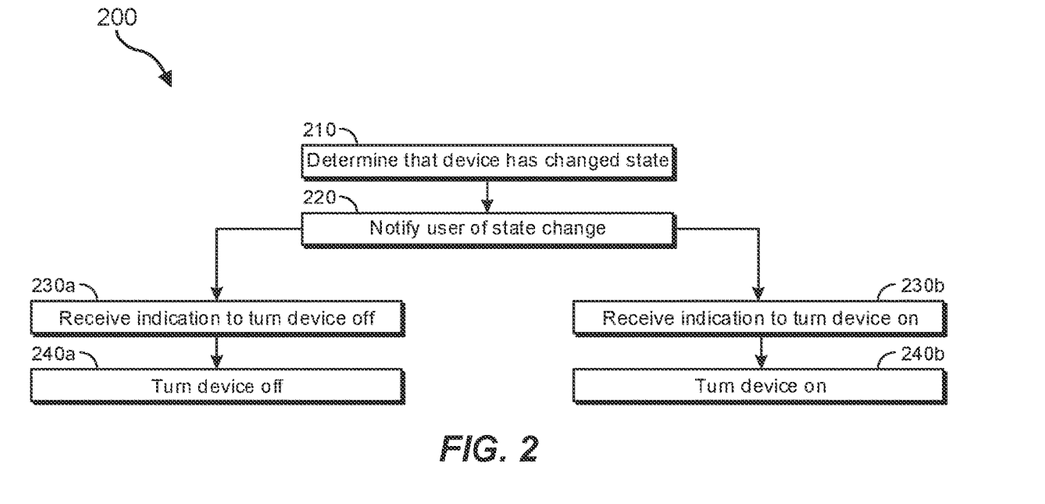
FIG. 2 illustrates a flowchart of an example method for remotely managing electrical devices.

In view of the systems and architectures described above, methodologies that may be implemented in accordance with the disclosed subject matter will be better appreciated with reference to the flow chart of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for remotely managing electrical devices. The method 200 will now be described with frequent reference to the components and data of environment 100 of FIG. 1.

Method 200 generally describes a method for remotely managing electrical and/or gas-powered devices. At step 210, the method includes determining that an electrical device has changed state. As noted in FIG. 1, the determining module 107 may determine that electrical device 115 has changed state from off to on, from on to off, from low to high or high to low, etc. At step 220, the method 200 may next include notifying at least one user (e.g., 112) that the electrical device 115 has changed state. The notification generating module 108 of computer system 101 may generate notification 111, which may be sent to specific people including, potentially, people that live in the same home or apartment where the electrical device 115 is currently located. Additionally or alternatively, the notification 111 may be sent to people that are outside of that home or apartment. Thus, in some cases, the notification 111 may be sent to an owner of a home or a renter of an apartment, as well as to a landlord, caretaker, parent, child, sibling, friend, security monitoring company, local dispatch, or other individual or entity.

At step 230a of method 200, the communications module 104 of computer system 101 may receive an indication (e.g., via input 114) from the one of the users to whom the notification 111 was sent (e.g., user 112) that the electrical device 115 is to be turned off. Then at step 240a, the control signal generating module 109 may generate a control signal 116 that is sent directly to the electrical device 115 to turn the device off, or is sent to an intermediary electromechanical component 117, solid-state relay, or switch that cuts power to the electrical device 115, thereby turning off electricity and/or gas to the appliance.

Alternatively, at step 230b, the communications module 104 may receive an indication from the user 112 that the electrical device 115 is to be turned on (or is to otherwise change state). Thus, in a similar manner, at step 240b, the control signal generating module 109 may generate a control signal 116 and may send the control signal to the electrical device 115 directly to turn the electrical device on (or otherwise change its state), or may send the control signal 116 to the electromechanical component 117, which then allows power to flow (or modifies power flow) to the electrical device 115 or allows gas to flow to the device.

Figure 3:
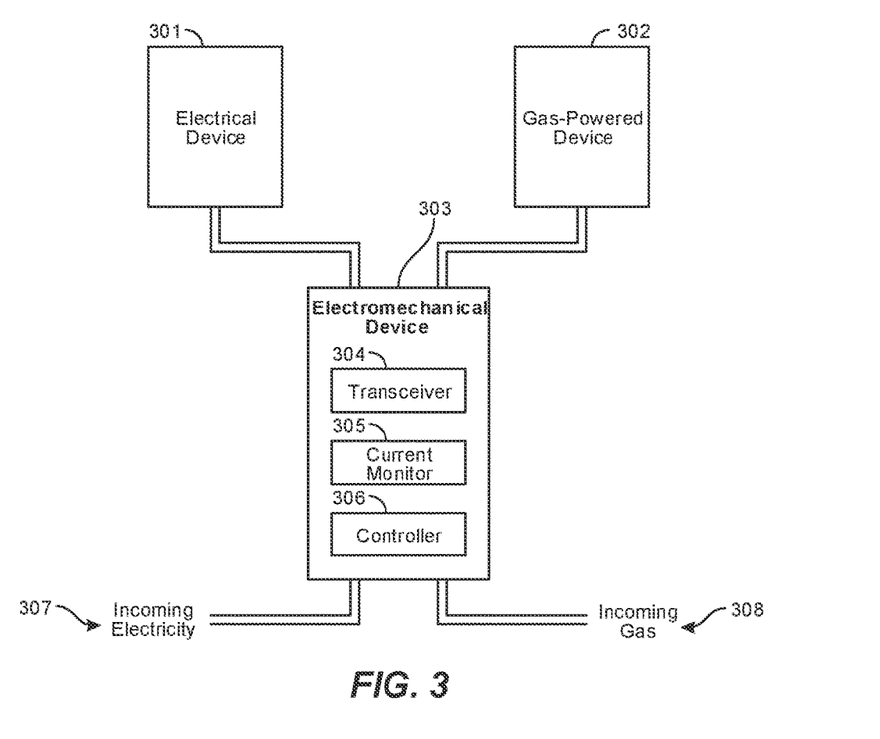
FIG. 3 illustrates an embodiment in which an electromechanical device controls electricity or gas supply to an electrical or gas-powered device.

FIG. 3 illustrates an embodiment in which an electromechanical device 303 is implemented to control electrical power to an electrical device 301 and/or to control the flow of gas (e.g., natural gas, propane, or similar fuel) to gas-powered device 302. In some cases, as noted above, turning an electrical device off may include sending a control signal to an electromechanical component that, when switched, prevents power from reaching the electrical device. Thus, electromechanical device 303 may include a transceiver 304 that receives signals including control signals and implements a controller 306 to determine how to respond to that control signal.

If the control signal indicates that the state of electrical device 301 is to be changed from off to on, the electromechanical device 303 may allow incoming electricity or current 307 to reach the electrical device 301. In some cases, the electromechanical device 303 may block power to the electrical device 301, while in other cases, the electromechanical device 303 may allow power to flow to the electrical device, at least for a specified period of time, monitor that current flow, and then turn the device from off to on. This electromechanical device 303 may be an electrically-controlled solenoid, a switch, a circuit breaker, a relay, an electrically-actuated valve (e.g., a ball valve), or other type of hardware or hardware/software combination that responds to incoming control signals and regulates flow of current 307 to the electrical device 301, and/or regulates the flow of gas 308 to the gas-powered device 302. Thus, regardless of whether the electrical or gas-powered devices are electric stoves, gas stoves, ovens, washing machines, clothes dryers, heating pads, laptops, blow dryers, hair straighteners, or other electrical or gas-based devices, the electromechanical device 303 may be configured to regulate the flow of gas and/or electricity to those devices.

In some cases, the electromechanical device 303 may be configured to determine when the electrical device 301 or the gas-powered device 302 has changed state. This may include monitoring an amount of current 307 flowing to the electrical device or gas 308 flowing to the respective devices 301/302. Additionally or alternatively, this may include monitoring the On/Off state of the knobs or switches on the appliance. A current monitor 305 (e.g., a hall effect sensor, a current transformer, which uses a magnetic field to detect the flow of current, a flow sensor that senses the amount of gas flowing, or a magnetic sensor configured to determine if the appliance knobs or switches have been turned on or off, etc.) may be configured to monitor how much electrical current is flowing to the electrical device 301 (current monitoring module 110 of FIG. 1 may perform the same or similar functions). The controller 306 may then determine when the amount of current changes beyond a specified threshold amount. Alternatively, the controller 306 may determine that the amount of gas flow has changed to the gas-powered device 302 beyond a specified threshold amount or that one or more of the appliance control knobs is determined to be turned on. If such occurs, the device 301/302 may be said to have changed state (e.g., from off to on, from low to high, etc.). In such cases, the electromechanical device 303 may act as a sensor to detect changes in electricity or gas usage and either inform the computer system 101, or use the controller 306 to implement logic that automatically turns the device off or otherwise changes its state once the determination has been made that current flow or gas flow has changed beyond the specified threshold amount (e.g., an amount specified by user 112).

Figure 4:
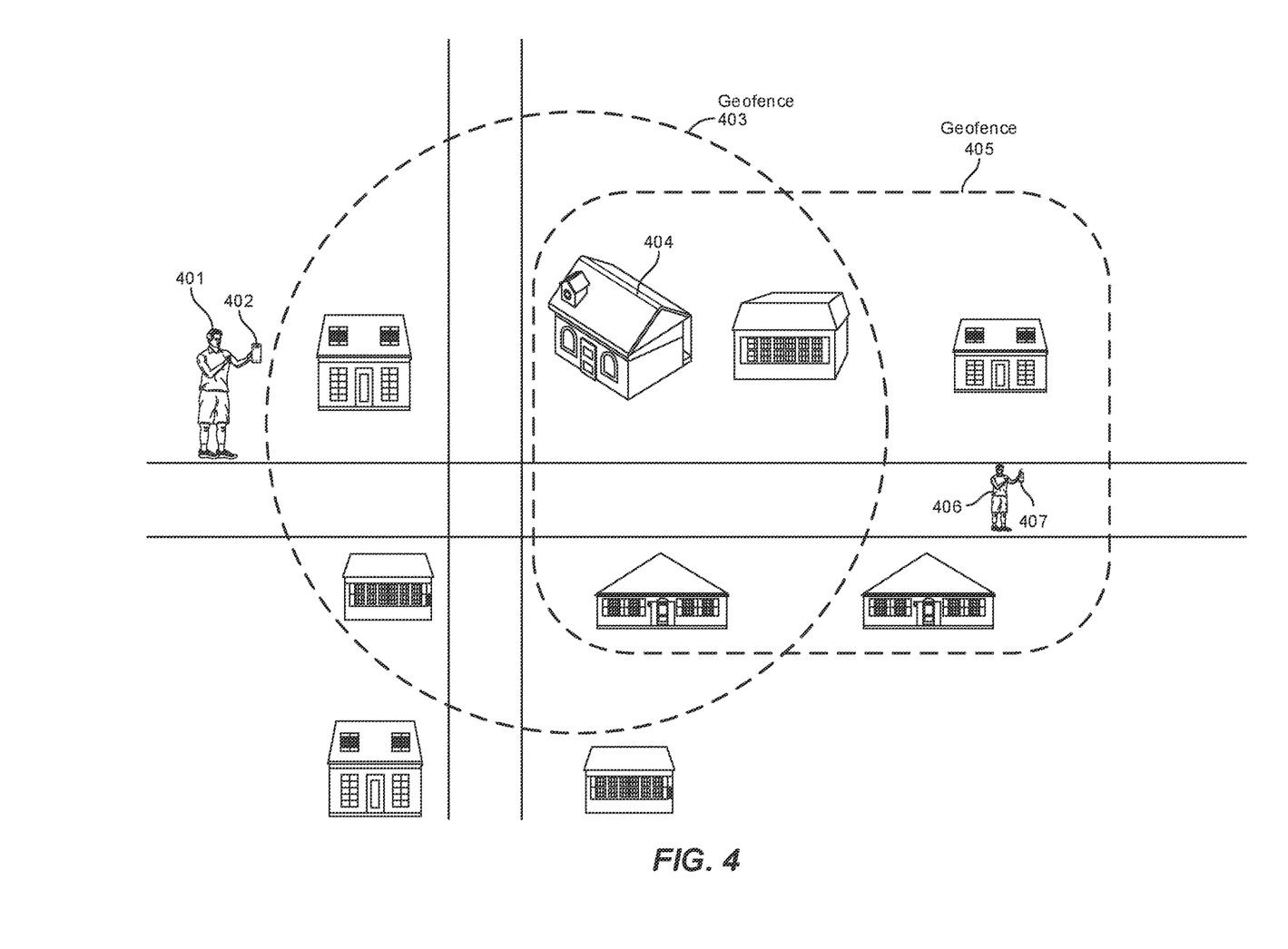
FIG. 4 illustrates an embodiment in which different geofences are established for different users.

In some embodiments, notifying one or more users that an electrical device has changed state may be performed automatically. In one example, the computer system 101 of FIG. 1 may determine that the user 112 has traveled beyond an established geofence. For instance, as illustrated in FIG. 4, user 401 (or, more particularly, user 401's electronic device 402) has traveled beyond geofence 403. If user 401 lives in home 404, for example, the system (e.g., computer system 101) may establish a geofence 403 for that user. If the user travels outside of that geofence 403, the notification generating module 108 may automatically generate a notification 111 that notifies the user 401 (and/or other users) that the user has gone outside the geofence, as determined by global positioning system (GPS) coordinates, WiFi triangulation, line of sight sensors (e.g., cameras), or other input signals.

Thus, in one specific example, the user 401 may turn on their electric stove to cook some eggs. The user 401 may accidentally forget that the electric stove is still turned on and may leave their house to run errands. Once the computer system 101 determines (via any of the above means) that the user 401 has traveled outside of the geofence 403, the notification generating module 108 may automatically generate and send a notification 111 to the user's device 402. The user 401 may then see that the electrical device is still turned on and may provide an input 114 to turn the device off. That input may then be sent directly to the electrical device, which turns the device off, or to the intermediary electromechanical component 117, which then cuts off power to the electrical device or cuts off gas to the gas-powered device.

In another example, a caretaker or child of an elderly individual may establish a geofence 403 for that person. If that elderly person then leaves the geofence, the notification generating module 108 may automatically generate and send a notification 111 to the caretaker's or child's electronic device. The caretaker or child may then respond to the notification and turn off or lower power to or otherwise change the state of the electrical device. Thus, notifications are not always sent to the person actually using the electrical device, but may be sent to other individuals to manage use of that device. Moreover, at least in some cases, the same notification 111 may be sent to multiple devices associated with the user. Thus, for example, user 112 may receive notification 111 on their mobile phone, on their laptop, and/or on their vehicle's or their home's infotainment system. The user 112 may be able to configure or select which of their devices will receive notification and may, in some cases, designate that some devices receive certain types of notifications (e.g., "device was turned off" notifications or geofence-related notifications), while other devices receive other types of notifications (e.g., "device was turned on" or "device was turned to 'High'" notifications).

In some cases, a separate geofence may be established for each user. Thus, if individuals 401 and 406 of FIG. 4 both live in house 404, the geofence 403 may be applied to user 401, and geofence 405 may be applied to user 406. As such, in the embodiment of FIG. 4, a notification would be automatically generated for user 401 and sent to their device 402 since they were outside their specific geofence 403, but would not be sent to the device 407 of user 406 since, although they are outside of geofence 403, they are not outside of geofence 405, which applies to them. As such, different users within the same household may have different geofences. Each geofence may be customized in size and shape, and need not be circular as shown in FIG. 4.

In like manner, the state of the electrical device may be managed according to a timer. The timer 118 of FIG. 1, for example, may regulate how long the electrical device 115 may be turned on. This timer 118 may be different for different users. Thus, in FIG. 4, for example, if user 401 was more responsible and was more reliable about turning off the electrical or gas-powered device when they were done with it, user 401 may have a longer amount of time before a notification 111 is automatically generated and sent to specified users. If user 406, however, is less reliable, and is more likely to leave the electrical or gas-powered device turned on, or turned on to a high level, the length of the time for user 406 may be customized to be shorter in length. Thus, once this shorter timer length has been reached, for example, after turning an oven on, the notification generating module 108 may generate and send a notification, or the control signal generating module 109 may be configured to simply generate a control signal 116 that turns the device off (with or without generating any notifications). Thus, the state of the electrical or gas-powered device may be regulated according to custom timers that are applied differently for each user.

Figure 5:
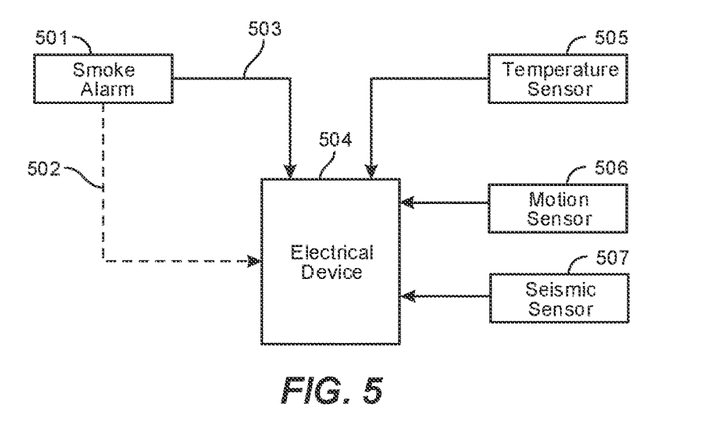
FIG. 5 illustrates an embodiment in which an electrical device is controlled based on various environmental factors.

In still other cases, notifying a user that the electrical device has changed state may be performed automatically upon determining that a smoke alarm within a specified distance of the electrical device was either disconnected from power or has signaled an alarm. In FIG. 5, for instance, a smoke alarm 501 may be installed in a home and connected with a wired power supply and a battery backup power supply. If the smoke alarm is disconnected from the wired power source (for whatever reason), the smoke alarm 501 may use its battery backup power to send a signal 502 to nearby electrical devices (e.g., 504) or to computer system 101 of FIG. 1, indicating that the smoke alarm has been disconnected from power.

In such cases, the control signal generating module 109 of computer system 101 may generate a control signal 116 that cuts power to the electrical device (and potentially to multiple electrical and/or gas-powered devices). This control signal may be transmitted via radio transmission or may be transmitted audibly using audible signals. Alternatively, the signal from the smoke alarm may be received at the electromechanical component 117, which may then process the signal and cut off power or gas to the device. In other cases, if the smoke alarm 501 is triggered based on a sufficient amount of smoke in the air, the computer system 101 and/or the electromechanical component 117 may be configured to listen for the smoke alarm signal 503 and automatically generate a control signal 116 indicating that power is to be cut to the electrical device 504 or, in the case of the electromechanical component 117, may directly cut power upon detecting the smoke alarm signal. In either case, a notification 111 may be automatically generated and sent to the user 112 to which the use can respond, issuing a shutdown signal.

Moreover, the user 112 may be automatically notified when the temperature near the electrical device 504 has risen beyond a specified amount, or when motion sensors detect a minimum threshold amount of movement. For example, if temperature sensor 505 determines that the temperature in the area around the electrical device 504 has risen beyond a specified amount (e.g., 10+ degrees hotter than normal), the notification generating module 108 may automatically generate and send a notification 111. Additionally or alternatively, the control signal generating module 109 may automatically generate a control signal 116 that cuts off power to the electrical device 504 if such a temperature change is recorded.

In other cases, if a motion sensor 506 in the area around the electrical device senses a minimum amount of movement, the notification generating module 108 may automatically generate and send a notification 111, and the control signal generating module 109 may automatically generate a control signal 116 that cuts off power to the electrical device 504. Such actions may be implemented, for example, with a forgetful person who often leaves the stove on for long periods of time. If the motion sensor 506 detects motion in the kitchen, for example, the system may cut power to the nearby electrical devices so that that user cannot cause harm by leaving the stove (or other devices) on.

In some embodiments, a seismic sensor 507 may be implemented to detect seismic activity caused by earthquakes. In some cases, a minimum threshold amount of seismic activity may be set. Then, if the seismic sensor 507 detects seismic activity beyond the set threshold amount, the notification generating module 108 may automatically generate and send a notification 111 to one or more users. The electromechanical device 303 of FIG. 3 may also be configured to automatically cut power to the electrical device 301 or cut gas to the gas-powered device 302, or to at least reduce the amount of current or gas flowing to those respective devices, in response to detecting the minimum threshold amount of seismic activity. Accordingly, in this manner, notifying one or more users that the electrical device has changed state may be performed automatically upon determining that a seismic sensor has sensed a minimum amount of seismic activity. The seismic sensor 507 may comprise a three-axis accelerometer, or other sensor or device capable of sensing seismic movement in an area.

Still further, it should be noted that the temperature sensor 505, the motion sensor 506, or other sensors may be used in conjunction with timers, such that some motion or rise in temperature may be allowed in the morning when the user normally wakes and cooks breakfast, or in the evening around dinner time, but otherwise triggers a notification and/or control signal that kills power to the electrical device 504. Accordingly, in such embodiments, these sensors may have different settings during the overnight hours or during specific hours of the day, thereby allowing normal use of the electrical device while preventing use that is out of the ordinary.

Figure 6:
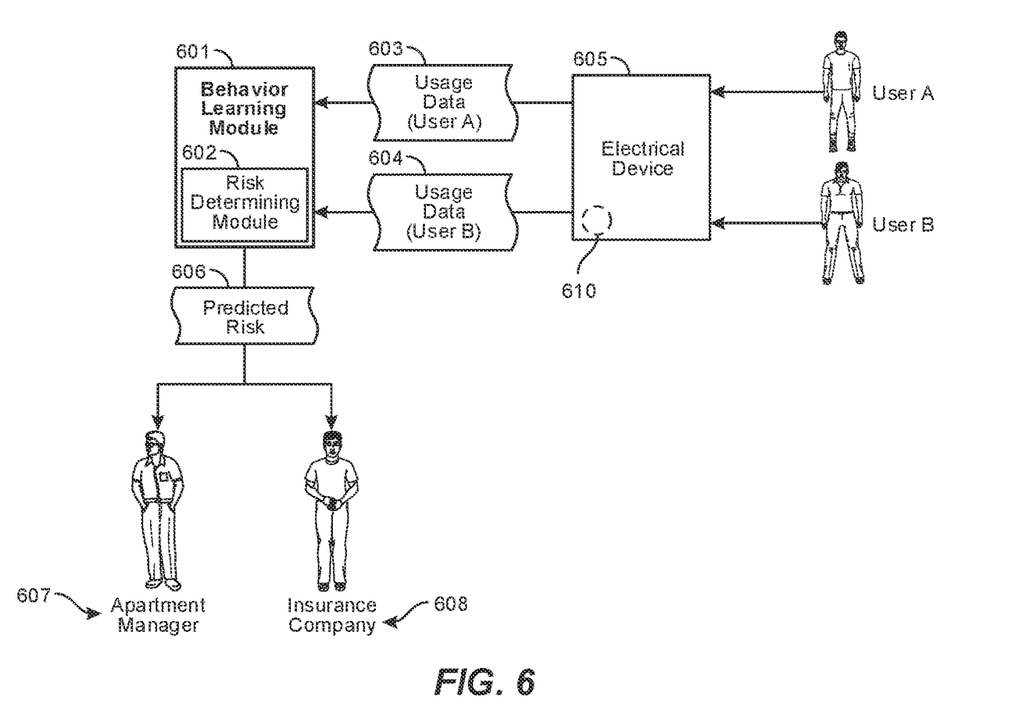
FIG. 6 illustrates an embodiment in which a system learns a user's behavior and predicts a level of risk associated with that user.

Along these lines, and as shown in FIG. 6, a behavior learning module 601 may be implemented as a standalone module or as part of another computer system (e.g., behavior learning module 119 of computer system 101 in FIG. 1). The behavior learning module 601 (or 119 of FIG. 1) may be configured to monitor and learn a given user's behavior over time. Thus, for instance, electrical device 605 may be located in a home or apartment that has a single user or has multiple users. In cases where the electrical device 605 has a single user (e.g., user A), the behavior learning module 601 may be configured to receive or otherwise access usage data 603 for user A. The usage data 603 may indicate when user A uses the electrical device 605 (e.g., time of day, duration of use, type of use, normal heat levels, etc.). The behavior learning module 601 may keep track of this usage data and may store the data in a data store such as a database. The behavior learning module 601 may also learn the behavior of other users including gathering usage data 604 for user B. In cases where multiple users use the electrical device 605, the system may implement cameras, biometric readings (e.g., voice scanners, fingerprint scanners, retinal scanners, etc.), or past usage patterns to determine which user is currently using the electrical device 605. In such cases, the behavior learning module 601 may learn how the device is used by each member of the household, and may adapt to new users as they come or leave over time.

In some cases, the system may thus learn over time the various users' behaviors with respect to the electrical device 605. In some embodiments, the system may then modify how various steps are performed including modifying how users are notified and which state changes will be implemented with respect to the electrical device 605. For instance, over time, the behavior learning module 601 may learn that when user A uses the electrical device 605, they nearly always turn the device off. Thus, in such cases, the system may modify the step of notifying the user that the electrical device has changed state. For instance, the system may increase the length of the time before generating a notification, or may allow an increase in risen temperature, or may allow a small increase in the size of the geofence because the system has learned that it is highly likely that user A will come back to turn the device off and that they likely left it turned on for a reason.

User B, however, may be opposite of user A, and may be quite forgetful. In such cases, the system may modify the step of notifying the user (or other users), and may decrease the length of the timer before a notification is sent, or may decrease the amount the temperature is allowed to rise near the electrical device 605, or may decrease the size of the geofence for that user. As such, for user B, the system will be much more likely to trigger generation and transmission of a notification than for user A. Over time, if user B becomes better at turning the device off when they are finished using it, the system may again adjust settings and parameters to allow more leniency for user B. In this manner, the system continually auto-regulates itself to ensure that the electrical device 605 is not left on for too long, especially to the point where it could cause a fire.

In some cases, the system be configured to determine which user changed the electrical device's state and may turn the electrical device off or turn the electrical device on (or otherwise change the device's state) depending on which user changed the electrical device's state. Thus, the system may be configured to determine, for instance, that user A turned the device on and may allow the electrical device 605 to stay running because the usage data 603 indicates that user A is responsible about turning the device off when done. Conversely, the system may determine that user B turned the electrical device 605 on and may send a control signal to cut off power to the electrical device 605, as the usage data 604 indicates that user B is irresponsible and often leaves the device turned on. This process may occur automatically, and may occur with notifications or without sending notifications. In cases where the electrical device 605 is turned off because a person determined by the behavior learning module 601 to be irresponsible turned it on, the system may lock out the electrical device for a specified (configurable) period of time, cutting (or reducing) power to that device.

In some embodiments, the system may also implement a risk determining module 602 to determine a level of risk associated with a user. For instance, the risk determining module 602 (which may be separate from or part of behavior learning module 601) may gather usage data 603/604 related to use of the electrical device 605 and, based on the gathered usage data, may predict which users have the highest level of risk associated with the electrical device. The predicted level of risk 606 may indicate, for example, that user A is a low-risk individual because they either rarely use the electrical device 605, or they have proven over time to be responsible about turning the device off. On the other hand, the predicted level of risk 606 may indicate that user B, for instance, is a high-risk individual because they use the electrical device 605 often and/or have shown to be forgetful about turning the device off. This level of predicted risk may be established for each user initially, and may change over time (e.g., increase or decrease) depending on the usage data 603/604 for that user. The level of risk may be calculated using machine learning. The machine learning may analyze data related to a user's usage of a device and, upon learning the user's cooking habits (or other electrical device usage habits), may generate an informed risk opinion indicating how likely it is that the user will have a fire-related issue due to leaving an electrical device turned on.

In some cases, the predicted level of risk 606 may be sent to caregivers, apartment managers 607, insurance companies 608, and/or to the users themselves. The apartment managers 607 and/or insurance companies 608 may then use this information to provide discounted or increased rates to tenants or insures based on the predicted level of risk 606. In one specific example, the predicted level of risk 606 may be at least partially based on usage data indicating how many times a smoke alarm associated with the user has been activated over a specified period of time.

In some embodiments, a computer-implemented method is provided specifically for remotely managing gas-based appliances. In this method, a computer system (e.g., 101 of FIG. 1) may determine that a gas-based appliance has changed state, may notify various users that the gas-based appliance has changed state, and may then either receive an indication from one of the users that the gas-based appliance is to be turned off and cut off gas supply to the gas-based appliance, or may receive an indication from one of the users that the gas-based appliance is to be turned on and then initiate gas supply to the gas-based appliance. In some cases, cutting off gas supply to the gas-based appliance may include sending a control signal 116 to the device directly or sending the control signal to an intermediary electromechanical component 117. This electromechanical component, when switched, may prevent gas from reaching the gas-based appliance. This gas-based appliance may be a gas stove, a gas drier, a gas oven, a main gas supply to a home or building, or other gas-powered device.

In some cases, the control signal 116 may fully cut off power or gas to a given device, preventing that device from running. In other cases, however, the control signal 116 may not entirely cut off power or gas to the device, but may place limits on the functionality of the device or appliance, allowing some functions to be performed but preventing others. In still other cases, the control signal 116 may specify an amount of time during which the device or appliance will function (e.g., for 10 or 20 minutes), after which the controller will cut off gas or electrical power. In some cases, for example, the control signal generating module 109 may send an electrical signal to the electromechanical component 117 (e.g., a solenoid) that, when open, allows power or gas to reach the device for 15 minutes, and when the 15 minutes has elapsed, sends an electrical signal close the solenoid, preventing power or gas from reaching the device.

As noted above, the computer system 101 may include hardware and/or software configured to determine who turned the electrical (or gas) device on. For instance, the controller may be communicatively connected to a biometric scanner (e.g., a fingerprint reader, an iris scanner, a voice-recognition unit, a facial-recognition unit, or similar biometric device) that positively identifies the user attempting to turn the device on. In other cases, a user may use a phone to operate or check-in with the appliance, and the computer system may determine who the user is based on their phone or other mobile device that is controlling the device. In such cases, when the controller has determined who the user is, the computer system may implement one or more policies associated with that user that limit or prevent use of the appliance. For example, if a parent had a handicapped child, or if the controller was installed in the home of an elderly person with limited physical or cognitive abilities, the controller may determine which user is attempting to use the appliance and either allow some limited functionality, allow full functionality, or prevent the appliance or device from working altogether.

The policies may be specific to each person that uses the appliance, or may be specific to a given household (applying to each person in that household) or to a given apartment or to an apartment building. In some cases, the policies may specify certain times of day (e.g., from 9 pm-7 am) during which the appliance is prevented from operating. The policy may apply every day or may only apply on certain days, or may be applied upon the controller determining that an attempt has been made to turn the appliance on. In some cases, the policy may specify the maximum temperature at which the oven, stove, or range may operate, and may limit gas or electricity accordingly.

In some embodiments, a user may be established as the administrator or the guardian that will be notified when an appliance is turned on. That administrator or guardian may receive a notification each time a stove, for example, is turned on. That administrator or guardian may then reply to the notification, indicating that yes, the stove may continue functioning, yes, the stove may function in a limited manner, or no, the stove may not operate at all. The computer system may then interpret this reply and control the stove accordingly. In this manner, an administrator or guardian may have full control of the appliance or other device remotely from any location with an internet connection. In some cases, the administrator may be notified if a user's pendant device (e.g., a device configured to notify other entities that a user has fallen and may be hurt) has been triggered. In such cases, the computer system or the intermediary electromechanical device may receive a wireless signal (e.g., Bluetooth or WiFi signal) indicating that, because the pendant has been triggered, power to specific devices or power or gas to all devices associated with that user are to be cut off.

In some cases, the computer system may include a data store (either local or remote) and may keep a log of each time the appliance or device changes state. Still further, the controller may include or may have access to a microphone. The microphone may be configured to record sounds including the sound of a smoke alarm sounding. The controller may interpret the sound of the smoke alarm as the alarm having triggered based on detecting a specified amount of smoke. The controller may note each time the smoke alarm goes off. This log may be tracked over time and all, or portions thereof may be transmitted to a remote location or to a computer system for analysis.

In some cases, this historical smoke alarm data may be combined with demographic data. In some situations, for example, age may be taken into consideration when determining which households are most at risk for fires. In some cases, elderly people may be more likely to experience house fires due to ovens or stoves being left on, potentially with food still cooking. If the approximate age of the residents is known, along with the past smoke alarm history, highly accurate estimates may be generated by the risk determining module 602 indicating which households are most likely to have issues with house or apartment fires down the road. In such cases, these households may be outfitted with devices that listen for smoke alarms and then cut electrical power or gas to the appliances most likely to cause a fire. These devices may be separate from the computing systems described herein, or may be incorporated into the computing systems described herein. Or, said in another way, the computing systems described herein may be incorporated into the listening devices that are designed to listen for smoke alarms and kill electrical power or gas to the appliances to which they are connected.

Other embodiments are also described herein. For example, many people, including seniors or younger children, may find it difficult to turn on the correct burner on the stove. For example, the diagram on the stove knob might be worn out or may just be confusing, potentially resulting in someone turning on the wrong burner. Also, these people may be confused in knowing when the stove is turned off. For example, the markings may be worn off or the location on the dial can be confusing as to letting the person know the correct position for the knob for the stove to be off.

In the past, stove manufactures have typically only used two colors to display the diagram for aligning the stove knob to the correct burner. These colors have traditionally been black and white. The diagrams are typically also very small and difficult to see. Many times, kitchen fires start or people get burned by turning on the wrong stove burner. These are simple mistakes that can be avoided with correct stove burner association.

In some embodiments described herein, large colored stickers 610 may be placed on the stove knobs. These color stickers may be separately associated with each burner. As such, the colored stickers may dramatically help to identify the correct knob to the correct burner. In some embodiments, the off location is clearly marked on the sticker for the knob. This makes the user confident they have turned off the burner completely. Still further, special stickers or paint may be used to further differentiate the burners from each other. In some cases, copper wiring may be embedded in the stickers to allow the stickers to absorb heat from the burner so the sticker next to the burner can change colors when the stove is hot. When the sticker changes colors, the color (e.g., red) may inform the user that the stove burner is hot and may serve as a warning not to touch it until the sticker returns to its's normal color.

In some cases, a round printed circuit board assembly (PCBA) or other current or magnetic force detector may be installed behind one or more of the knobs on a stove or other appliance. In such cases, one or more magnetic sensors may be installed on the back of the knobs, such that the magnetic sensors on the knobs face the PCBA or other detectors installed where the knob stems from on the stove or other appliance. Used in combination, these current or magnetic force sensors may determine whether each knob is turned on or off and, if the knob is turned on, the level or degree to which the knob is turned.

In such cases, the notification generating module 108 of FIG. 1 may automatically send out notifications based on current knob position. If the knobs are all turned off, based on detected current or magnetic force, the notification generating module 108 may avoid sending a notification and the electromechanical component 117 may avoid sending a control signal 116 to cut power or gas to the device. However, if at least one of the knobs is determined to be turned on (at least to some degree), the notification generating module 108 may send a notification 111 and/or the electromechanical component 117 may send a control signal 116 to cut power or gas to the stove or other device. This embodiment would allow users to implement this functionality on their existing stoves or other appliances, without having to replace the knobs with aftermarket versions. Rather, users may simply install the PCBA on the stove or other device where the knobs stem out, install magnetic or current sensors on the backs of the knobs, and then place the knobs back over the stems. The computer system 101 may then interface with the sensors on the stove to determine when knobs are turned on or off and may take action accordingly.

In one embodiment, a computer system is implemented to perform the method for remotely managing electrical devices. As mentioned above, the electrical devices that are managed may include devices or systems that control utilities such as electrical, gas, or water. At least some of the embodiments described herein implement or comprise a computing system. This computing system may be as simple as a single processor or microcontroller, or may involve a full distributed computing system (such as a cloud computing system), or anywhere in between. Indeed, in some embodiments, the computing system may be configured to generate notifications and communicate with users regarding the use of certain electrical or electronic devices, or the use of utilities such as electrical, gas, or water devices or systems. These electrical or electronic devices may comprise any type of device that runs on electricity or implements electronic components of any kind. The utilities may similarly be regulated using electrical or electrically switched devices. The computer system (or modules thereof) may be configured to monitor the usage of these devices by monitoring current usage, by monitoring device states, or by monitoring input interfaces that control the devices.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Computing systems typically include at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. Computing system may also contain communication channels that allow the computing system to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

In some cases, the computer system may include a communications module that communicates with other computing systems. The communications module may include any wired or wireless communication means that can receive and/or transmit data to or from other computing systems. The communications module may be configured to interact with databases, mobile computing devices (such as mobile phones or tablets), embedded or other types of computing systems.

Accordingly, methods, systems and computer program products are provided which allow users to remotely manage electrical devices. Moreover, electronic devices are provided which allow users to remotely manage electrical devices.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for remotely managing electrical devices, the method comprising: determining that at least one electrical device has changed state; identifying which user is using the electrical device;
    notifying at least one user that the electrical device has changed state, wherein the notifying is modified based on which identified user is using the electrical device, such that one or more thresholds for triggering the notifying are adjusted based on past electrical device usage associated with the identified user;
    performing at least one of the following:
    receiving an indication from the at least one user that the electrical device is to be turned off; and
    turning the electrical device off; and
    receiving an indication from the at least one user that the electrical device is to be turned on; and turning the electrical device on, as presented in the claimed invention.

2. The computer-implemented method of claim 1, wherein turning the electrical device off comprises sending a control signal to an electromechanical component that, when switched, prevents power from reaching the electrical device.

3. The computer-implemented method of claim 1, wherein the electrical device comprises an electric stove.

4. The computer-implemented method of claim 1, wherein determining that the electrical device has changed state further includes monitoring an amount of current flowing to the electrical device and determining when the amount of current changes beyond a specific threshold amount.

5. The computer-implemented method of claim 1, wherein the electrical device is turned off according to a timer whose length is customized for the at least one user.

6. The computer-implemented method of claim 1, wherein notifying the at least one user that the electrical device has changed state is performed automatically upon determining that the user has traveled beyond an established geofence.

7. The computer-implemented method of claim 6, wherein the established geofence is established separately for each user.

8. The computer-implemented method of claim 1, wherein notifying the at least one user that the electrical device has changed state is performed automatically upon determining that a smoke alarm within a specified distance of the electrical device is disconnected from power.

9. The computer-implemented method of claim 1, wherein notifying the at least one user that the electrical device has changed stats is performed automatically upon determining that a smoke alarm within a specified distance of the electrical device has signaled an alarm.

10. The computer-implemented method of claim 1, wherein notifying the at least one user that the electrical device has changed state is performed automatically upon determining that the temperature in an area around the electrical device has risen beyond a specified moment.

11. The computer-implemented method of claim 1, wherein notifying the at least one user that the electrical device has changed state is performed automatically upon determining that a motion sensor in an area around the electrical device has sense a minimum amount of movement.

12. The computer-implemented method of claim 1, wherein notifying the at least one user that the electrical device has changed state is performed automatically upon determining that a seismic sensor has sensed a minimum amount of seismic activity.

13. A system comprising:
    at least one physical processor; and
    physical memory comprising computer-executable instructions that, when executed by the physical processor, cause the physical processor to:
        determine that at least one electrical device has changed state;
        identify which user is using the electrical device;
        notify at least one user that the electrical device has changed state, wherein the notifying is modified based on which identified user is using the electrical device, such that one or more thresholds for triggering the notifying are adjusted based on past electrical device usage associated with the identified user;
        perform at least one of the following:
            receive an indication from the at least one user that the electrical device is to be turned off; and
            turn the electrical device off; and
            receive an indication from the at least one user that the electrical device is to be turned on; and
            turn the electrical device on.

14. The system of claim 13, further comprising:
    learning, over a specified period of time, one or more of the user's behaviors with respect to the electrical device; and
    modifying the step of notifying the at least one user that the electrical device has changed state based on the user's learned behaviors.

15. The system of claim 13, further comprising:
    determining which user changed the electrical device's state; and
    turning the electrical device off or turning the electrical device on depending on which user changed the electrical device's state.

16. The system of claim 13, further comprising locking out the electrical device for a specified period of time.

17. The system of claim 13, further comprising:
    gathering one or more portions of usage data related to use of the electrical device; and
    based on the gathered usage data, predicting which users have the highest level of risk associated with the electrical device.

18. The system of claim 17, wherein the prediction is based on usage data indicating how many times a smoke alarm associated with the user has been activated over a specified period of time.

19. At a computer-implemented method for remotely managing gas-based appliances, the method comprising:
    determining that at least one gas-based appliance has changed state;
    identifying which user is using the gas-based appliance;
    notifying at least one user that the gas-based appliance has changed state, wherein the notifying is modified based on which identified user is using the gas-based appliance, such that one or more thresholds for triggering the notifying are adjusted based on past gas-based appliance usage associated with the identified user;
    performing at least one of the following:
        receiving an indication from the at least one user that the gas-based appliance is to be turned off; and
        cutting off gas supply to the gas-based appliance; or
        receiving an indication from the at least one user that the gas-based appliance is to be turned on; and
        initiating gas supply to the gas-based appliance.

20. The computer-implemented method of claim 19, wherein cutting off gas supply to the gas-based appliance comprises sending a control signal to an electromechanical component that, when switched, prevents gas from reaching the gas-based appliance.

21. The computer-implemented method of claim 19, wherein the gas-based appliance comprises a gas stove.

* * * * *